Patented Jan. 30, 1934

1,945,312

UNITED STATES PATENT OFFICE 1,945,312

PROCESS OF PREPARING DEHYDROROTENONE

Herbert L. J. Haller and Paul S. Schaffer, Washington, D. C.; dedicated to the free use of the public No Drawing. Application April 10, 1933
Serial No. 665,445

6 Claims. (Cl. 260—123)

(Granted under the act of March 3, 1883, as amended April 30, 1928; 370 O. G. 757)

This application is made under the act of March 3, 1883, as amended by the act of April 30, 1928, and the invention herein described may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to a process of preparing dihydrorotenone by hydrogenating rotenone or suitable plant extracts containing rotenone in the presence of a nickel catalyst.

Dihydrorotenone has been prepared by the reduction of rotenone with hydrogen, using platinum oxide catalyst or palladium-barium sulfate catalyst. With these catalysts there is formed in addition to dihydrorotenone variable amounts of rotenonic acid and dihydrorotenonic acid. See for example Butenandt, Ann. Chem. 464: 253–277, 1928; Kariyone, Kimura and Kondo, Chem. Abs. 19: 1708, 1925; LaForge and Smith, Jour. Amer. Chem. Soc. 51: 2574–2581, 1929; and Takei, Koide and Miyajima, Ber. deut. chem. Gesell. 63: 508–511, 1930. Moreover the use of platinum or palladium catalyst is too expensive for technical use.

We have found that rotenone is readily hydrogenated to dihydrorotenone in excellent yields with a nickel catalyst which is prepared from a nickel-aluminum alloy according to the process described by Covert and Adkins, Jour. Amer. Chem. Soc. 54; 4116, 1932. The reduction may be carried out in a number of suitable solvents although the rotenone need not be wholly in solution, either at room temperature or at higher temperatures and at atmospheric pressure or under higher pressures for instance at 40 to 50 lbs. per square inch. By a suitable solvent is meant any solvent which of itself does not react with the catalyst.

For the preparation of the dihydrorotenone, it is not necessary to use pure rotenone. A suitable extract of a plant containing rotenone may also be employed.

Examples of this process are as follows:

*Example 1.*—A solution of 5 gms. of rotenone in 75 cc. benzene at 35–45° C. is placed in the reaction bottle of a suitable catalytic reduction apparatus (for example, a Burgess-Parr catalytic apparatus) and 3 gms. of the nickel catalyst (prepared according to Covert and Adkins, Jour. Amer. Chem. Soc. 54: 4116, 1932) suspended in 10 cc. of ethyl alcohol are added. The apparatus is evacuated, then filled with hydrogen and the mixture is shaken with hydrogen until 285 cc. at 0° and 760 mm. equivalent to 1 mole has been absorbed. The solution is decanted from the catalyst, filtered and concentrated to a small volume; 15 cc. of ethyl alcohol are then added. Dihydrorotenone soon deposits from solution. The yield is 4.4–4.6 gms.

*Example 2.*—Fifty grams of the ground root of *Derris (Deguelia)* sp. (tuba root) is exhaustively extracted in a continuous extractor with acetone. The extract is concentrated to 50–75 cc. and placed in the reaction bottle of a suitable catalytic reduction apparatus and 3 gms. of nickel catalyst suspended in 10 cc. ethyl alcohol are added. The apparatus is evacuated, then filled with hydrogen and the mixture is shaken with hydrogen until the rate of absorption of hydrogen is very slow. The solution is decanted from the catalyst, filtered and concentrated to a small volume, and 10–25 cc. of ethyl alcohol are added. After standing for a short time the crystallization of dihydrorotenone is usually complete. The product is practically pure dihydrorotenone.

*Example 3.*—A solution of 5 gms. of rotenone in 100 cc. ethyl acetate at 35–40° C. is place in the reaction bottle of a suitable catalytic reduction apparatus and 2.5 gms. of the nickel catalyst suspended in 10 cc. of ethyl alcohol are added. The apparatus is evacuated, then filled with hydrogen and the mixture shaken with hydrogen until 285 cc. at 0° and 760 mm. equivalent to 1 mole has been absorbed. The solution is decanted from the catalyst, filtered and then concentrated to a small volume. The solution is cooled and the dihydrorotenone which crystallizes from the solution is filtered off. The yield is 3.9–4.2 gms. The filtrate contains an additional small quantity of dihydrorotenone.

*Example 4.*—One hundred grams of *Lonchocarpus nicou* (cube root) are exhaustively percolated with ether in the usual manner. The ether extract is concentrated to a thick syrup and then dissolved in 100 cc. of butyl acetate. The solution is placed in the reaction bottle of a suitable catalytic reduction apparatus and 1.5 gms. of nickel catalyst suspended in 10 cc. butyl acetate are added. The air is replaced with hydrogen and the mixture is shaken with hydrogen until hydrogen is no longer absorbed. The solution is filtered from the catalyst and concentrated to a small volume. Ten to 25 cc. of ethyl alcohol are then added. The solution soon deposits dihydrorotenone. It is filtered off and washed with a little alcohol. The product is practically pure dihydrorotenone.

Having thus described our invention, we claim:

1. The process of making dihydrorotenone which comprises hydrogenating rotenone in the presence of a nickel catalyst.

2. The process of making dihydrorotenone which comprises hydrogenating rotenone dissolved in an organic solvent in the presence of a nickel catalyst.

3. The process of making dihydrorotenone which comprises hydrogenating rotenone dissolved in an organic solvent, at room temperature and atmospheric pressure, in the presence of a nickel catalyst obtained by alloying equal parts of nickel and aluminum and then dissolving out the latter with aqueous sodium hydroxide.

4. The process of making dihydrorotenone which comprises hydrogenating an extract of *Derris (Deguelia)* sp. dissolved in an organic solvent in the presence of a nickel catalyst obtained by alloying equal parts of nickel and aluminum and then dissolving out the latter with aqueous sodium hydroxide.

5. The process of making dihydrorotenone which comprises hydrogenating an extract of *Lonchocarpus nicou* (cube root) dissolved in an organic solvent in the presence of a nickel catalyst obtained by alloying equal parts of nickel and aluminum and then dissolving out the latter with aqueous sodium hydroxide.

6. The process of making dihydrorotenone which comprises hydrogenating a rotenone-bearing plant extract dissolved in an organic solvent in the presence of a nickel catalyst obtained by alloying equal parts of nickel and aluminum and then dissolving out the latter with aqueous sodium hydroxide.

HERBERT L. J. HALLER.
PAUL S. SCHAFFER.

CERTIFICATE OF CORRECTION.

Patent No. 1,945,312.  January 30, 1934.

HERBERT L. J. HALLER, ET AL.

It is hereby certified that error appears in the above numbered patent requiring correction as follows: In the grant and in the heading to the printed specification, title of invention, for the word "Dehydrorotenone" read Dihydrorotenone; and that the said Letters Patent should be read with this correction therein that the same may conform to the record of the case in the Patent Office.

Signed and sealed this 20th day of March, A. D. 1934.

F. M. Hopkins (Seal)  Acting Commissioner of Patents.

little alcohol. The product is practically pure dihydrorotenone.

Having thus described our invention, we claim:

1. The process of making dihydrorotenone which comprises hydrogenating rotenone in the presence of a nickel catalyst.

2. The process of making dihydrorotenone which comprises hydrogenating rotenone dissolved in an organic solvent in the presence of a nickel catalyst.

3. The process of making dihydrorotenone which comprises hydrogenating rotenone dissolved in an organic solvent, at room temperature and atmospheric pressure, in the presence of a nickel catalyst obtained by alloying equal parts of nickel and aluminum and then dissolving out the latter with aqueous sodium hydroxide.

4. The process of making dihydrorotenone which comprises hydrogenating an extract of Derris (Deguelia) sp. dissolved in an organic solvent in the presence of a nickel catalyst obtained by alloying equal parts of nickel and aluminum and then dissolving out the latter with aqueous sodium hydroxide.

5. The process of making dihydrorotenone which comprises hydrogenating an extract of Lonchocarpus nicou (cube root) dissolved in an organic solvent in the presence of a nickel catalyst obtained by alloying equal parts of nickel and aluminum and then dissolving out the latter with aqueous sodium hydroxide.

6. The process of making dihydrorotenone which comprises hydrogenating a rotenone-bearing plant extract dissolved in an organic solvent in the presence of a nickel catalyst obtained by alloying equal parts of nickel and aluminum and then dissolving out the latter with aqueous sodium hydroxide.

HERBERT L. J. HALLER.
PAUL S. SCHAFFER.

CERTIFICATE OF CORRECTION.

Patent No. 1,945,312.  January 30, 1934.

HERBERT L. J. HALLER, ET AL.

It is hereby certified that error appears in the above numbered patent requiring correction as follows: In the grant and in the heading to the printed specification, title of invention, for the word "Dehydrorotenone" read Dihydrorotenone; and that the said Letters Patent should be read with this correction therein that the same may conform to the record of the case in the Patent Office.

Signed and sealed this 20th day of March, A. D. 1934.

F. M. Hopkins (Seal)  Acting Commissioner of Patents.